United States Patent
Lamers

(10) Patent No.: US 11,022,952 B2
(45) Date of Patent: Jun. 1, 2021

(54) SYSTEM AND METHOD FOR ENHANCING MANUFACTURING EFFICIENCY VIA OPERATOR ACTIVITY DETECTION

(71) Applicant: Illinois Tool Works Inc., Glenview, IL (US)

(72) Inventor: Nathan John Lamers, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 205 days.

(21) Appl. No.: 14/588,806

(22) Filed: Jan. 2, 2015

(65) Prior Publication Data

US 2016/0195867 A1 Jul. 7, 2016

(51) Int. Cl.
*G05B 19/406* (2006.01)
*G05B 19/402* (2006.01)
(Continued)

(52) U.S. Cl.
CPC .......... *G05B 19/402* (2013.01); *B23K 9/0953* (2013.01); *G05B 19/406* (2013.01);
(Continued)

(58) Field of Classification Search
CPC ............. G06Q 10/06; G06Q 10/06393; G06Q 10/0639; G05B 19/402; G05B 19/406; G07C 3/00; G07C 3/04; B23K 9/0953
See application file for complete search history.

(56) References Cited

U.S. PATENT DOCUMENTS

| | | | |
|---|---|---|---|
| 8,788,308 B1 * | 7/2014 | Cox | G06Q 10/063116 705/7.13 |
| 2010/0211429 A1 * | 8/2010 | Benson | B24C 9/00 700/174 |

(Continued)

FOREIGN PATENT DOCUMENTS

| | | |
|---|---|---|
| CN | 102667008 | 9/2012 |
| CN | 103235555 | 8/2013 |
| CN | 103459077 | 12/2013 |

OTHER PUBLICATIONS

Insight Core Brochure, https://www.millerwelds.com/pdf/spec_sheets/InsightCoreBrochure.pdf, #266011 © 2013 Miller Electric Mfg. Co.

(Continued)

*Primary Examiner* — Mohammad Ali
*Assistant Examiner* — Vincent W Chang
(74) *Attorney, Agent, or Firm* — McAndrews, Held & Malloy, Ltd.

(57) ABSTRACT

A system for optimizing manufacturing utilization is disclosed. The system includes a manufacturing apparatus configured to transmit a first electronic message type indicating a time period when the manufacturing apparatus is in use, as well as a sensor disposed in a work cell associated with the manufacturing apparatus, the sensor configured to transmit a second electronic message type indicating a time period of operator activity within the work cell. The system further includes a computing device configured to receive the first and second electronic message types and accumulate one or more of each of the respective time periods of the first and second electronic message types. The computing device determines utilization of the manufacturing apparatus based on accumulated time periods corresponding to the first electronic message type as a percentage of accumulated time periods corresponding to the second electronic message type.

20 Claims, 2 Drawing Sheets

(51) Int. Cl.
  *G07C 3/04* (2006.01)
  *B23K 9/095* (2006.01)
  *G06Q 10/06* (2012.01)
  *G07C 3/00* (2006.01)

(52) U.S. Cl.
  CPC ... *G06Q 10/0639* (2013.01); *G06Q 10/06393* (2013.01); *G07C 3/00* (2013.01); *G07C 3/04* (2013.01); *G05B 2219/37217* (2013.01)

(56) References Cited

U.S. PATENT DOCUMENTS

| | | |
|---|---|---|
| 2010/0224610 A1 | 9/2010 | Wallace |
| 2012/0085741 A1 | 4/2012 | Holverson et al. |
| 2013/0217332 A1* | 8/2013 | Altman ............... H04H 60/90 455/41.2 |
| 2014/0009496 A1* | 1/2014 | Chapman ............ G06Q 10/10 345/636 |
| 2014/0277684 A1 | 9/2014 | Lamers et al. |
| 2014/0278242 A1 | 9/2014 | Lamers et al. |
| 2014/0278243 A1 | 9/2014 | Lamers et al. |
| 2014/0358645 A1* | 12/2014 | Ehrman ........... G06Q 10/06393 705/7.39 |

OTHER PUBLICATIONS

Miller—Welding Information Management, http://millerwelds.com/products/advanced/insight/, Nov. 18, 2014.
Canadian Office Action Appln No. 2,971,705 dated Mar. 18, 2019.
Canadian Office Action Appln No. 2,971,705 dated Mar. 6, 2020.

* cited by examiner

SYSTEM AND METHOD FOR ENHANCING MANUFACTURING EFFICIENCY VIA OPERATOR ACTIVITY DETECTION

TECHNICAL FIELD

The present disclosure relates generally to manufacturing facility management, and more specifically to welding facility information management.

BACKGROUND

Maximizing manufacturing efficiency and utilization of manufacturing equipment requires an information management system that is able to track multiple efficiency metrics. For example, in the context of tracking utilization of welding equipment, an arc on percentage metric is the amount of time welding is happening within a work environment divided by the amount of available time. Typically, the available time is either the amount of time in the shift or possibly the amount of time the welding power supply is energized. While measuring the amount of time the machine power supply is energized could be a good measurement, it is however a manual process and has the probability for the welding power supply to be left on when not in use.

Another important efficiency metric is the number of equipment operators working during a shift or within a day. However, to obtain this number, it is typically necessary to pull the information from a time clock system, access to which could be problematic and time consuming.

SUMMARY

Embodiments of the present disclosure provide a system and method for determining operator activity-based utilization metrics, including an arc on time percentage determined via detecting operator activity in a work cell. In one embodiment, if there is activity detected in a work cell within a customer selected amount of time, such time is counted in the denominator of the arc on calculation to show arc on time as a percentage of a work day or another user-defined time period. Therefore, customers with employees that move to different work cells based on the work requirements will be able to get an arc on time percentage based on a calculated scheduled time that is based on activity in the work cell in clock time increments. In another embodiment, the system of the present disclosure does not require user selection of a work period (e.g., a work shift or some user-defined time span) during which operator activity based calculations described herein are performed. For instance, in such an embodiment, whenever activity is detected in a work cell, the period of such activity is automatically added to the denominator of an arc on percentage calculation.

In addition to recording the amount of time activity is detected in a work cell, embodiments of the present disclosure also determine how many people are in an environment at any time interval selected by the customer. For instance, if activity exists on average in "n" work cells throughout a shift it will be concluded that "n" is the number of employees working during that shift. Therefore, by detecting activity within a work environment, the system and method of present disclosure enable determining the number of employees working within a time period within a customer determined interval of clock time. With those clock time intervals being tracked, manufacturers can output the number of employees working within a time interval.

In one embodiment, a method for optimizing utilization of a manufacturing apparatus is disclosed. The method comprises receiving a first electronic message type indicating a time period when the manufacturing apparatus is in use, and receiving a second electronic message type indicating a time period of operator activity within a work cell associated with the manufacturing apparatus. The method further includes accumulating one or more of each of the respective time periods of the first and second electronic message types, and determining utilization of the manufacturing apparatus based on accumulated time periods corresponding to the first electronic message type as a percentage of accumulated time periods corresponding to the second electronic message type. Additionally, the method includes causing a display of the utilization of the manufacturing apparatus for the user.

In another embodiment, a system is disclosed. The system comprises a manufacturing apparatus configured to transmit a first electronic message type indicating a time period when the manufacturing apparatus is in use, as well as a sensor disposed in a work cell associated with the manufacturing apparatus, the sensor configured to transmit a second electronic message type indicating a time period of operator activity within the work cell. The system further includes a computing device configured to receive the first and second electronic message types and accumulate one or more of each of the respective time periods of the first and second electronic message types. The computing device determines utilization of the manufacturing apparatus based on accumulated time periods corresponding to the first electronic message type as a percentage of accumulated time periods corresponding to the second electronic message type.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
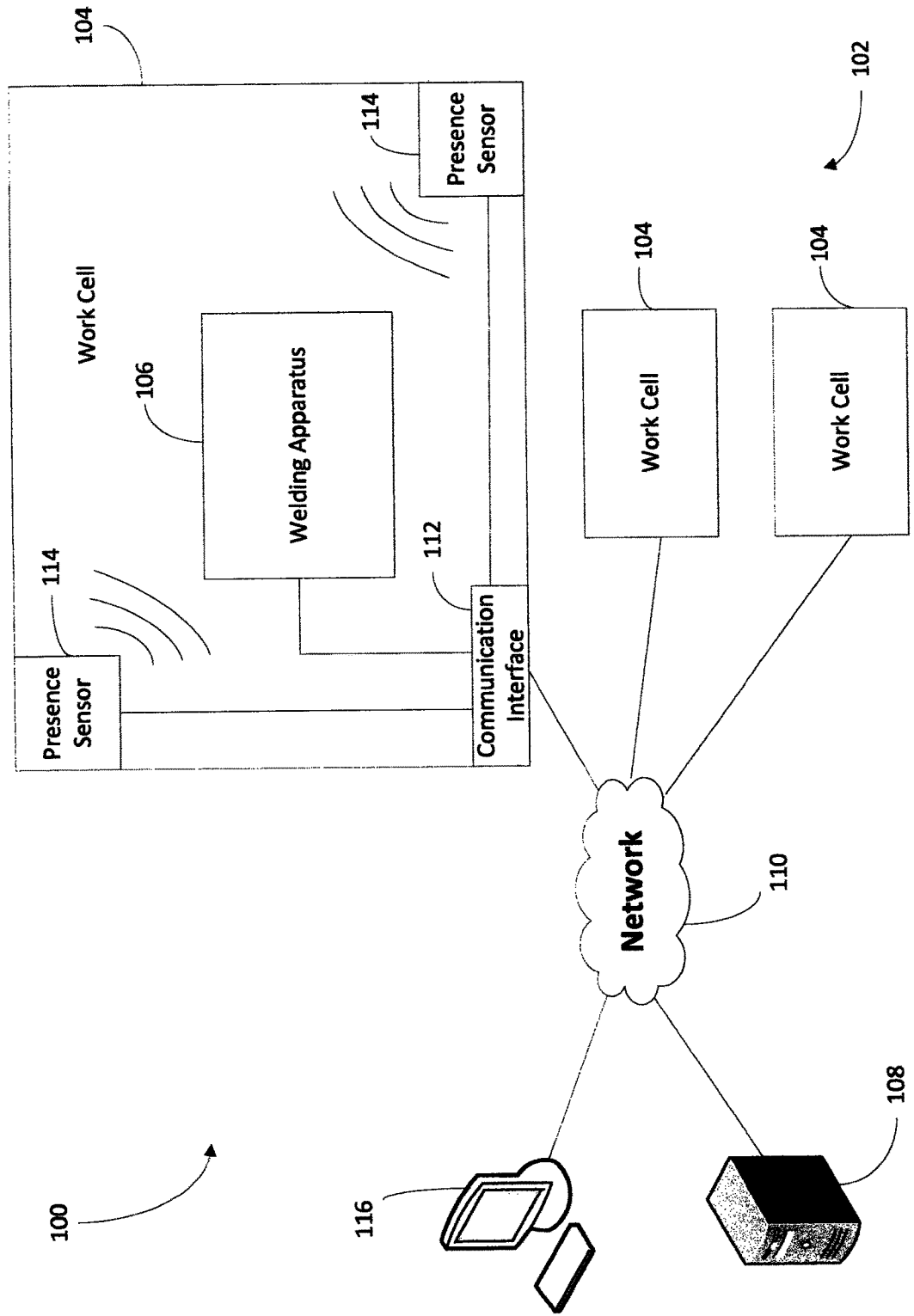
FIG. 1 is a block diagram illustrating an exemplary welding manufacturing system environment in which one embodiment of the present disclosure may operate.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Referring to FIG. 1, a system 100 for manufacturing facility information management is shown. As shown in FIG. 1, the system 100 includes a work area 102, such as a plant floor area, having a plurality of work cells 104, which are designated for a particular type of manufacturing activity. For instance, in the illustrated embodiment, the system 100 is a metal fabrication facility where the work cells 104 are welding work cells and each include at least one metal fabrication apparatus, such as a welding apparatus 106. The system 100 is configured to determine the degree of efficiency of the use of the welding apparatus 106 by the operator staff, as discussed in further detail below. In alternate embodiments, however, the work cells 104 include any other type of manufacturing machinery or tools that are configured to send a signal indicating its activation to the data management server 108 via the electronic network 110, such as the local area network (LAN), a Wide Area Network (WAN), or the Internet. In the illustrated embodiment, the welding apparatus 106 is connected to a communication interface 112, such as an AXCESS interface of the INSIGHT CORE welding information management system available from Miller Electric Manufacturing Co., 1635 W Spencer St., Appleton, Wis. 54914, an embodiment of such system being described in further detail in U.S. Application Publication Nos. 2014/0278243 and 2012/0085741, which are assigned to the present assignee and each incorporated by reference herein in its entirety. In one embodiment, the communication interface 112 includes one or both a wired (e.g., Ethernet based) and a wireless (e.g., Wi-Fi, Bluetooth, Zigbee and the like) connection to the welding apparatus 106. In another embodiment, the communication interface 112 is integrated into the welding apparatus 106.

When the operator strikes an arc (i.e., the welding apparatus is being used during the process of welding), the welding apparatus 106 sends to the data management server 108 via the network 110 an arc on indicator message, including an associated time stamp indicating the beginning and an end of a time period when an arc has been struck by the operator. Additionally, in accordance with the present disclosure, the work cell 104 includes one or more presence sensors 114 connected to the communication interface 112 via a wired and/or wireless network connection. In various embodiments, the presence sensors 114 include one or more of proximity or presence sensors including a motion sensor, such as a passive infrared (PIR) sensor, an acoustic sensor, a video camera, a photo camera, an air flow sensor, a pressure sensor (e.g., a pressure switch under a floor mat), a current sensor (e.g., detecting use of ancillary equipment), a sensor detecting use of a material clamp, a wireless device such as an RFID sensor, a mobile phone, a wearable sensor, a light current sensor, a safety floor mat, or any other electronic or mechanical sensors or combinations thereof configured to detect presence of a person by way of detecting movement, sound, pressure, air-flow and/or heat, and the like, including the sensors described in the incorporated U.S. Application Publication No. 2012/0085741. In an embodiment, upon detecting physical presence of a welding apparatus operator (e.g., plant worker) inside the work cell 104, the presence sensor(s) 114 communicate an operator present indicator signal, along with associated time stamps indicating beginning and end of operator presence, to the data management server 108 via the communication interface 112 and network 110. Based on the received arc on and operator present indicator messages, the data management server 108, in turn, is configured to accurately determine an arc on percentage that takes into account the time periods (e.g., throughout a shift) when the operator was actually present in the work cell 104 (an operator factor) and the welding apparatus 106 was available for use, as discussed in further detail below with reference to FIG. 2. In the illustrated embodiment, the arc on and operator present indicators and associated time stamps are received and stored in a database at the data management server 108, which calculates an operator factor-based arc on percentage for the time period specified by the user and presents it via a user interface of the user computing device 116. In various embodiments, the data management server 108 includes one or more computer processors executing computer readable instructions for determining an operator factor-based arc on percentage metric, as discussed in FIG. 2 below. Those skilled in the art will realize that one embodiment of the data management server 108 may be a single server machine, while other embodiments may include multiple network connected computer servers as a distributed computing implementation, with such servers located in the same or different physical locations.

Based on the operator present data, the data management server 108 additionally estimates the number of employees/operators working in the work area 102 during a user-defined time period by determining an average number of simultaneously active work cells 104 in which operator presence was detected. This removes the need to access time card records to determine this information for purposes of manufacturing efficiency reporting and analysis. While the illustrated embodiment depicts a data management server 108 that stores and processes the arc on and operator present messages and performs the associated calculations via one or more processors, those skilled in the art will realize that in alternate embodiments, this information may be stored and processed directly via the user computing device 116, such as a computer or a mobile computing device, including a dedicated portable computing terminal or a smart phone.

Figure 2:
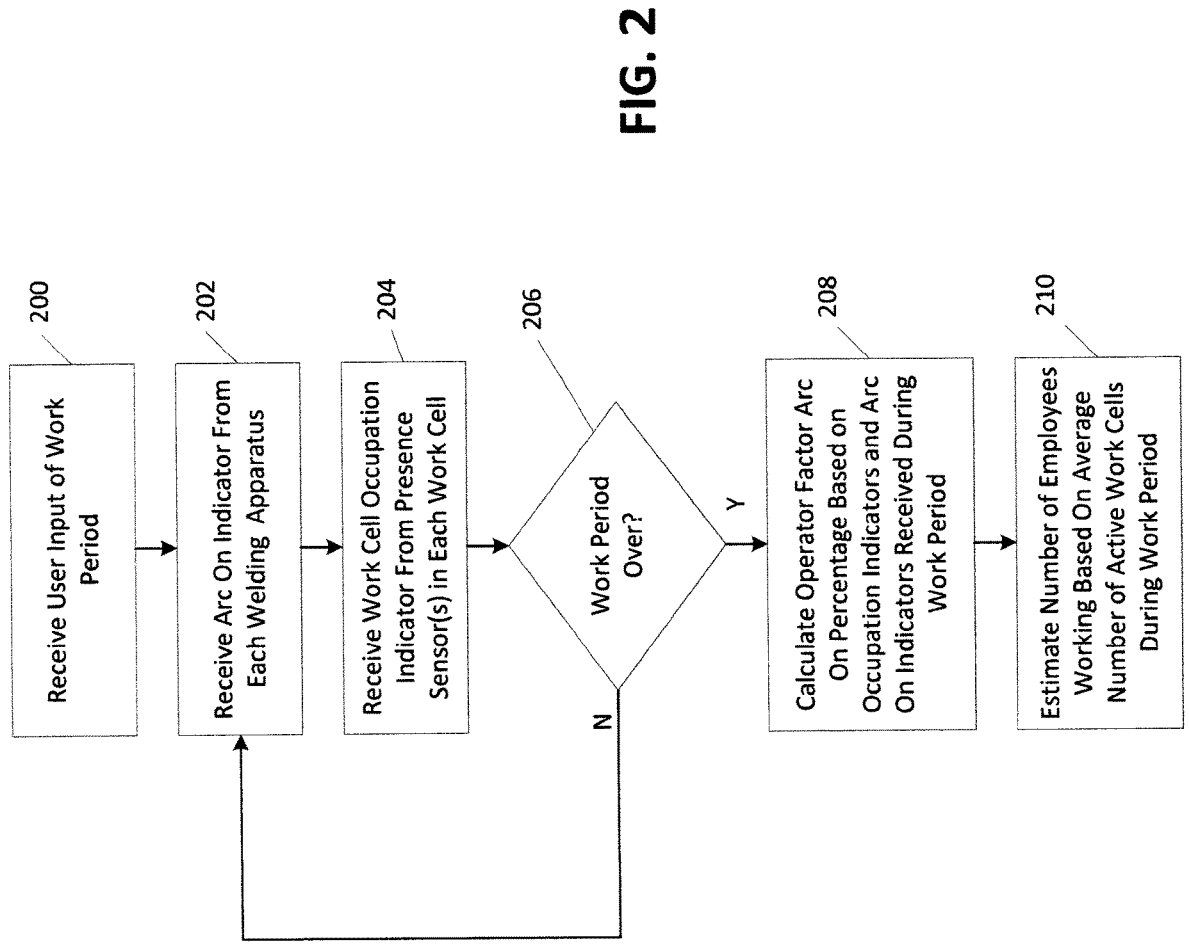
FIG. 2 is a flowchart illustrating a method for determining an operator factor based welding arc on time in a welding system of FIG. 1, according to an embodiment.

Referring to FIG. 2, an embodiment of a method for determining usage efficiency of a welding apparatus via an arc on percentage determination based on an operator presence factor is shown. In the illustrated embodiment, in step 200, the data management server 108 receives user input of a work period, such as a work shift time duration or a partial increment thereof, during which an arc on percentage and other operator presence based calculations need to be determined. A work period is generally an amount of time that is allocated to account for the activities in the work area. In step 202, the data management server 108 receives from each welding apparatus 106, an arc on indicator message along with an associated time stamp indicating the time and the duration of the time period during which an arc has been struck during the work period specified by the user in step 200. In step 204, the data management server 108 receives from the presence sensors 114 in each of the work cells 104 an operator present indicator message along with the time and the duration of the time period corresponding to the operator's presence in the work cell during the work period specified by the user. In step 206, the data management server 108 continues to accumulate the arc on and operator present messages and associated time information until the work period time duration specified by the user is over.

Next, in step 208, the data management server 108 calculates an arc on percentage indicative of the usage of each welding apparatus 106 based on the operator present and arc on messages received in steps 202, 204 during the work period specified by the user in step 200. In an embodiment, for a given work period specified by the user, the operator factor-based arc on percentage is calculated by dividing the total amount of time during which arc on indicator messages were received (i.e., based on a sum of associated arc on durations) by the operator factor—i.e., by the total amount of time during which the operator was detected to be present in the work cell 104. This provides an accurate estimation of welding apparatus utilization and operator efficiency.

Finally, in step 210, the data management server 108 determines the number of employees or operators working in the work area 102 throughout the work period defined by the user. In particular, if activity is detected on average in "n" work cells 104 throughout the shift or another user defined time period (e.g., as a trend over multiple work periods), then the data management server 108 determines that "n" is the number of employees that worked during that shift. As discussed above in connection with FIG. 1, the data management server causes the user device 116 to display a report having a graphical and/or numerical representation of the operator factor-based arc on percentage and the number of employees working during the user specified time interval for tracking equipment utilization rate and manufacturing efficiency. While, the embodiments of the operator presence based arc on percentage and number of employees determinations described above are associated with a user-selected work period, additional embodiments include calculations of the above-described metrics without user input of a work period. For instance, in such embodiments, the above-described metrics are determined whenever activity is detected in a work cell.

In general, operator factor based calculations utilize detection of operator presence and/or activity type for determining a number of efficiency metrics, such as an arc on percentage, a number of people working during a time period, among others. For instance, in various embodiments, additional information can be gathered, calculated, and displayed. For example, the active time of tools, machines, or processes may be individually tabulated along with or in lieu of arc on time. Thereby, a more complete understanding of all activities of the work area may be gained. In one illustrative example, an operator was in the work area for four hours and spent one hour welding (arc on), one hour on non-value added grinding, one hour fitting parts, while the operator's activity for another hour is unknown. Thus, a welding operator efficiency of 25% arc on time percentage would be displayed. The additional gathered data (e.g., identifying remaining activity) could be used to understand what is preventing the operator from welding. For example, when the operator is spending an equal amount of time on non-value added grinding, as in the above example.

In various embodiments, determining how many operators worked during a shift (e.g., via presence and/or activity type detection), enhances the accuracy of determination of various additional efficiency metrics, such as the arc on percentage, as well as deposition rate per person and/or per hour (deposition is the amount of filler metal deposited in a piece or work, weldment or individual weld). The operator factor based calculation can account for job shops where people move around to different work cells depending on orders or on the work that needs to be done. For example, if presence is detected in 10 of the 15 work cells in a predetermined percentage (e.g., 60 percent or more) of the 32 work periods in a given shift, it could be determined that there are 10 operators working that shift. In one embodiment, knowing the number of people within each shift takes the guess work out of an arc on percentage calculation where: (number of operators)×(number of hours in a shift) is in the denominator of the arc on percentage equation. We will know the denominator in the equation if we can accurately tell how many people are there as operators.

In another embodiment, a true arc on percentage may be calculated as follows:

Total number of minutes multiple machines are active (i.e., arc is on)/number of minutes multiple people are working on any given shift.

Operator factor is relevant in the above calculation because there could be people that weld but also operate other equipment or have other duties within an environment. In such a case, operator factor based analysis avoids counting in the above equation the time the operators are operating bending equipment or attending to non-welding duties.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make and use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method for optimizing utilization of a plurality of manufacturing apparatus in a manufacturing facility, the method comprising:
receiving user input of a work period for determining operator presence based calculations;
receiving, by a processor, first electronic messages comprising start times and end times indicating time periods when ones of the plurality of manufacturing apparatus are in use;
receiving, by the processor, second electronic messages indicating time periods of operator activity within ones of a plurality of work cells associated with the plurality of manufacturing apparatus from a plurality of sensors disposed in the work cells;
accumulating, by the processor, one or more of each of the respective time periods of the first and second electronic messages;
determining, by the processor, a number of operators in the manufacturing facility during the work period by determining numbers of simultaneously active ones of the plurality of the work cells, based on the second electronic messages;
determining, by the processor, utilization of the plurality of manufacturing apparatus based on the number of operators and based on the time periods of operator activity and the work period;
determining a total number of operators present in a work shift, where the work shift comprises a plurality of work periods that includes the work period; and
providing a report regarding utilization of the plurality of manufacturing apparatus for analysis of use of the manufacturing apparatus,
wherein the number of operators determined to be present in the work shift is the number of work cells each with operator activity in more than a pre-determined percentage of work periods in the work shift,
wherein the total number of operators is the number of work cells with operator activity in more than a pre-determined percentage of the plurality of work periods, and
wherein the work period is automatically determined for each activity detected in the work cell.

2. The method of claim 1 wherein at least one of the plurality of manufacturing apparatus is a welding apparatus.

3. The method of claim 2 wherein the time period when the welding apparatus is in use is an arc on time period.

4. The method of claim 2 wherein the utilization is an arc on percentage based on detected operator activity in the work cell.

5. The method of claim 1 wherein the operator activity is detected via a presence sensor.

6. The method of claim 5 wherein the presence sensor is one or both of a motion detector and a camera.

7. The method of claim 5 wherein the presence sensor is an acoustic sensor.

8. The method of claim 5 wherein the presence sensor is selected from the group consisting of an air flow sensor, a material clamp sensor, a pressure sensor, a current sensor, a light beam sensor, a floor mat sensor, a wireless sensor, a wearable sensor, and a proximity sensor.

9. A system for optimizing manufacturing utilization comprising:
a plurality of manufacturing apparatus configured to:
perform manufacturing operations in association with a manufacturing process;
measure start times and end times of periods during which the manufacturing apparatus are in use for the manufacturing operations; and
transmit first electronic messages indicating respective time periods when the manufacturing apparatus are in use;
a plurality of sensors disposed in corresponding work cells associated with the manufacturing apparatus, the sensors configured to transmit second electronic messages indicating time periods of operator activity within the work cell; and
a computing device configured to:
receive user input of a work period for determining operator presence based calculations;
receive the first and second electronic messages and accumulate one or more of each of the respective time periods of the first and second electronic messages;

determine a number of operators in the manufacturing facility during the work period by determining numbers of simultaneously active ones of the plurality of work cells, based on the second electronic messages;

determine utilization of the plurality of manufacturing apparatus based on the number of operators and based on the time periods of operator activity and the work period;

determine a total number of operators present in a work shift, wherein the work shift comprises a plurality of work periods that includes the work period; and provide a report regarding utilization of the plurality of manufacturing apparatus for analysis of use of the manufacturing apparatus, wherein the number of operators determined to be present in the work shift is the number of work cells each with operator activity in more than a pre-determined percentage of work periods in the work shift, wherein the total number of operators is the number of work cells with operator activity in more than a pre-determined percentage of the plurality of work periods, and wherein the work period is automatically determined for each activity detected in the work cell.

10. The system of claim 9 wherein the computing device is further configured to cause a display of the utilization of the manufacturing apparatus for a user.

11. The system of claim 9 wherein at least one of the plurality of manufacturing apparatus is a welding apparatus.

12. The system of claim 11 wherein the time period when the welding apparatus is in use is an arc on time period.

13. The system of claim 11 wherein the utilization is an arc on percentage based on operator activity in the work cell detected by the sensor.

14. The system of claim 11 wherein the welding apparatus is configured to output welding power.

15. The system of claim 9 wherein the sensor is a presence sensor.

16. The system of claim 15 wherein the presence sensor is one or both of a motion detector and a camera.

17. The system of claim 15 wherein the presence sensor is an acoustic sensor.

18. The system of claim 15 wherein the presence sensor is selected from the group consisting of an air flow sensor, a material clamp sensor, a pressure sensor, a current sensor, a light beam sensor, a floor mat sensor, a wireless sensor, a wearable sensor, and a proximity sensor.

19. A system for optimizing utilization of a plurality of apparatus in a manufacturing facility, comprising:

a plurality of sensors disposed in work cells associated with the plurality of apparatus, the sensors configured to transmit second electronic messages indicating time periods of operator activity within the work cell; and a computing device configured to:
receive user input of a work period for determining operator presence based calculations;

receive from each of the plurality of apparatus first electronic messages comprising start times and end times of periods during which each of the corresponding plurality of apparatus is in operation;

receive the second electronic messages from the sensors;

accumulate one or more of each of the respective time periods of the first and second electronic message;

determine a number of operators in the manufacturing facility during the work period by determining numbers of simultaneously active ones of the plurality of work cells, based on the second electronic messages;

determine utilization of the plurality of apparatus based on the number of operators and based on the time periods of operator activity and the work period;

determine a total number of operators present in a work shift, wherein the work shift comprises a plurality of work periods that includes the work period; and provide a report regarding utilization of the plurality of apparatus for analysis of use of the apparatus, wherein the number of operators determined to be present in the work shift is the number of work cells each with operator activity in more than a pre-determined percentage of work periods in the work shift, wherein the total number of operators is the number of work cells with operator activity in more than a pre-determined percentage of the plurality of work periods, and wherein the work period is automatically determined for each activity detected in the work cell.

20. The system of claim 19 wherein the sensor is one or more of a camera, a motion detector, an air flow sensor, a material clamp sensor, a pressure sensor, a current sensor, a light beam sensor, a floor mat sensor, a wireless sensor, a wearable sensor, and a proximity sensor.

\* \* \* \* \*